(12) United States Patent
Shibata

(10) Patent No.: US 9,120,053 B2
(45) Date of Patent: Sep. 1, 2015

(54) POLYOLEFIN-COMPOSITE HOLLOW-FIBER MEMBRANE AND MANUFACTURING METHOD FOR SAME, AND HOLLOW-FIBER MEMBRANE MODULE

(75) Inventor: Noritaka Shibata, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 44 days.

(21) Appl. No.: 13/876,655

(22) PCT Filed: Sep. 28, 2011

(86) PCT No.: PCT/JP2011/072157
§ 371 (c)(1),
(2), (4) Date: Jun. 12, 2013

(87) PCT Pub. No.: WO2012/043613
PCT Pub. Date: Apr. 5, 2012

(65) Prior Publication Data
US 2013/0255498 A1    Oct. 3, 2013

(30) Foreign Application Priority Data
Sep. 29, 2010    (JP) ................................. 2010-218042

(51) Int. Cl.
*B01D 53/22* (2006.01)
*B01D 61/02* (2006.01)
*B01D 71/26* (2006.01)
*B01D 69/08* (2006.01)

(52) U.S. Cl.
CPC .............. *B01D 53/228* (2013.01); *B01D 61/02* (2013.01); *B01D 69/088* (2013.01); *B01D 71/26* (2013.01); *B01D 2325/30* (2013.01); *B01D 2325/34* (2013.01)

(58) Field of Classification Search
USPC ..................................... 95/43, 45; 96/4, 8, 10
See application file for complete search history.

(56) References Cited

U.S. PATENT DOCUMENTS

| 4,664,681 | A | * | 5/1987 | Anazawa et al. ................. 96/10 |
| 4,925,459 | A | * | 5/1990 | Rojey et al. ....................... 95/50 |
| 5,104,425 | A | * | 4/1992 | Rao et al. ........................... 95/47 |
| 5,431,864 | A | * | 7/1995 | Rao et al. ..................... 264/29.5 |
| 5,702,503 | A | * | 12/1997 | Tse Tang ........................... 95/45 |
| 6,503,294 | B2 | * | 1/2003 | Yoshikawa et al. ............... 95/45 |
| 2001/0020416 | A1 | * | 9/2001 | Yoshikawa et al. ............... 95/45 |
| 2004/0000231 | A1 | * | 1/2004 | Bikson et al. ..................... 95/45 |
| 2015/0059576 | A1 | * | 3/2015 | Shibata ............................... 96/6 |
| 2015/0122129 | A1 | * | 5/2015 | Shibata |

FOREIGN PATENT DOCUMENTS

| JP | 5-185067 | 7/1993 |
| JP | 6-335623 | 12/1994 |
| JP | 11-47565 | 2/1999 |
| JP | 2008-272696 | 11/2008 |
| JP | 2009-112896 | 5/2009 |

OTHER PUBLICATIONS

Noritaka JP2008-272696 Nov. 13, 2008 Machine Translation.*
Noritaka JP2009-112896 May 28, 2009 Machine Translation.*
International Search Report issued Nov. 1, 2011, in International application No. PCT/JP2011/072157 (with English translation), 1 pg.

* cited by examiner

*Primary Examiner* — Jason M Greene
*Assistant Examiner* — Anthony Shumate
(74) *Attorney, Agent, or Firm* — Oblon, McClelland, Maier & Neustadt, L.L.P.

(57) ABSTRACT

The present invention pertains to a polyolefin-composite hollow-fiber membrane and a manufacturing method for the same, said polyolefin-composite hollow-fiber membrane having: a homogenous membrane layer formed from polyolefins having a metal flow rate measured in accordance with JIS K7210 code D of 1.0 g/10 minutes, or less, and an Mw/Mn ratio of not more than 4.0; and a porous membrane layer which is formed from polyolefins having an Mw/Mn ratio of 8.0-12.0. The present invention also pertains to a hollow-fiber membrane module which is equipped with the polyolefin-composite hollow-fiber membrane. The present invention enables the provision of a polyolefin-composite hollow-fiber membrane, a manufacturing method for the same and a hollow-fiber membrane module; the polyolefin-composite hollow-fiber membrane has excellent solvent resistance and gas permeability, and when used in the deaeration of dissolved gas in a drug solution, can suppress leakage of the drug solution to a high degree, and can efficiently reduce the amount of dissolved gas.

15 Claims, 2 Drawing Sheets

POLYOLEFIN-COMPOSITE HOLLOW-FIBER MEMBRANE AND MANUFACTURING METHOD FOR SAME, AND HOLLOW-FIBER MEMBRANE MODULE

This application is a National Stage of PCT/JP11/072157 filed Sep. 28, 2011 and claims the benefit of JP 2010-218042 filed Sep. 29, 2010.

TECHNICAL FIELD

The present invention relates to a polyolefin-composite hollow-fiber membrane, a manufacturing method for the same, and a hollow-fiber membrane module comprising the polyolefin-composite hollow-fiber membrane.

The present application asserts its priority based on Japanese Patent Application No. 2010-218042 filed on Sep. 29, 2010, and its contents are incorporated herein.

BACKGROUND ART

In the production of liquid-crystal display, plasma display and the like, various treatments involving drug solution, such as resist solution, are performed. Drug solution is applied by first being pumped to a discharge nozzle using nitrogen gas and then by being discharged through the discharge nozzle. However, in the treatments involving drug solution, when the amount of dissolved gas in the drug solution is substantive, air bubbles can be generated due to the supersaturation of the dissolved gas. This is because the pressure being applied to the drug solution by the nitrogen gas is reduced to atmospheric pressure as the drug solution is discharged through the discharge nozzle. Intrusion of air bubbles into the drug solution, such as resist solution, causes treatment patches and creates problems such as patterning defect during the lithography step. Means for preventing treatment patches of drug solution include a method using spin coat in which the drug solution is degassed as it is being applied. However, with the recent trend for liquid-crystal displays and plasma displays to have ever-larger screens, it is increasingly becoming difficult to employ the method in which the drug solution is applied using spin coat.

On the other hand, a deaeration method using a hollow-fiber membrane as a deaeration membrane is employed for removing dissolved gas from drug solution and the like. In this method, membrane-mediated deaeration by the hollow-fiber membrane is carried out during the drug solution pumping step, in which the amount of dissolved gas in the drug solution is reduced and the generation of air bubbles is suppressed. As to the hollow-fiber membrane used in the membrane-mediated deaeration, composite hollow-fiber membrane having a non-porous homogeneous membrane layer with gas permeability and a porous membrane layer that supports the homogeneous membrane layer, is known. Examples of composite hollow-fiber membrane include the following.

(1) A composite hollow-fiber membrane having a three-layered structure wherein a gas permeable homogeneous membrane layer consisting of silicone-polycarbonate copolymer, silicone-urethane copolymer and the like, is sandwiched between two porous membrane layers consisting of polyolefin (see Patent Document 1, for example).

(2) A composite hollow-fiber membrane having a three-layered structure wherein a homogeneous membrane layer consisting of linear chain polyethylene is sandwiched between two porous membrane layers (see Patent Document 2).

(3) A composite hollow-fiber membrane having a porous membrane layer consisting of poly-4-methylpentene-1 and a homogeneous membrane layer (see Patent Document 3).

Patent Document 1: Japanese Unexamined Patent Application, Publication No. H5-185067
Patent Document 2: Japanese Unexamined Patent Application, Publication No. H11-47565
Patent Document 3: Japanese Unexamined Patent Application, Publication No. H6-335623

DISCLOSURE OF THE INVENTION

Problems to be Solved by the Invention

However, since silicone-polycarbonate copolymer and silicone-urethane copolymer are poor in terms of solvent resistance, the composite hollow-fiber membrane of (1) is prone to membrane swelling and strength reduction, leading to the leakage of drug solution (solvent).

As to the composite hollow-fiber membrane of (2), since the oxygen permeability coefficient of the homogeneous membrane layer is low, it is necessary to make the homogeneous membrane layer into an extremely thin layer of no more than 0.3 μm in order to obtain practically applicable permeability for the dissolved gas. However, because of the difficulty in making the homogeneous membrane layer thinner, the mechanical strength of the membrane could be decreased, resulting in the generation of pinholes. In addition, when the porosity of the porous membrane layer is low, the area of the homogeneous membrane layer contributing to gas permeability is reduced, resulting in the reduction of the amount of permeating gas. For this reason, in order to increase the gas permeability of the porous membrane layer, it is required to extend it at a high ratio during the production. However, during this process, the homogeneous membrane layer can crack, resulting in the failure to achieve the sufficient gas separating properties.

In regard to the composite hollow-fiber membrane of (3), since the elasticity of the porous membrane layer is low, it is not possible to extend it at a high extension ratio during the production process for the purpose of making the porous membrane layer porous. Thus, it is difficult to obtain sufficient gas permeability.

The present invention is aimed at providing a polyolefin-composite hollow-fiber membrane having excellent solvent resistance and gas permeability, and when used in the deaeration of dissolved gas in a drug solution, can suppress leakage of the drug solution to a high degree, and can efficiently reduce the amount of dissolved gas, and a manufacturing method for the polyolefin-composite hollow-fiber membrane and a hollow-fiber membrane module comprising the polyolefin-composite hollow-fiber membrane.

Means for Solving the Problems

In order to solve the problems listed above, the present invention adopted the following constitution.

[1] A polyolefin-composite hollow-fiber membrane comprising a non-porous, homogeneous membrane layer that is permeable to gas, and a porous membrane layer supporting the homogeneous membrane layer, wherein the homogeneous membrane layer comprises polyolefins having an Mw/Mn ratio of mass average molecular weight (Mw) and number average molecular weight (Mn), of no more than 4.0, and a melt flow rate as measured in accordance with code D of JIS K7210 (MFRD) of no more than 1.0 g/10 min., and wherein the porous membrane layer comprises polyolefins having an Mw/Mn ratio of 8.0 to 12.0.

[2] The polyolefin-composite hollow-fiber membrane according to [1] above, wherein the melt flow rate as measured in accordance with code D of JIS K7210 (MFRD), for the polyolefins of the homogeneous membrane layer and the polyolefins of the porous membrane layer, are both 0.1 to 1.0 g/10 min.

[3] The polyolefin-composite hollow-fiber membrane according to [2] above, wherein the polyolefins of the porous membrane layer satisfy the requirements (a) to (c) listed below.

(a) The melt flow rate as measured in accordance with code D of JIS K7210 (MFRD) is 0.1 to 1.0 g/10 min.
 (b) The melt flow rate as measured in accordance with code G of JIS K7210 (MFRG) is 50 to 100 g/10 min.
 (c) The ratio of the MFRD and the MFRG, FRR(G/D) (=MFRG/MFRD), is 50 to 100.

[4] The polyolefin-composite hollow-fiber membrane according to any one of [1] to [3] above, wherein the difference between the MFRD of the polyolefins of the homogeneous membrane layer and the MFRD of the polyolefins of the porous membrane layer is no more than 0.3 g/10 min.

[5] The polyolefin-composite hollow-fiber membrane according to any one of [1] to [4] above, wherein the content of the component of the polyolefins in the porous membrane layer having the molecular weight of no more than 1000 is no more than 2.0 mass %, and the content of the component having the molecular weight of no less than 1 million is 1.5 to 3.0 mass %.

[6] The polyolefin-composite hollow-fiber membrane according to any one of [1] to [4] above, wherein the polyolefins of the homogeneous membrane layer is a copolymer comprising constitutional unit derived from α-olefin having a carbon number of 3 to 20.

[7] The polyolefin-composite hollow-fiber membrane according to [6] above, wherein the content of the constitutional unit derived from the α-olefin is 10 to 70 mol % relative to 100 mol % of the constitutional unit derived from all of the monomers used in polymerization.

[8] The polyolefin-composite hollow-fiber membrane according to [6] or [7] above, wherein the carbon number of the constitutional unit derived from the α-olefin is 6 to 8.

[9] The polyolefin-composite hollow-fiber membrane according to any one of [6] to [8] above, wherein the α-olefin is 1-octene or 1-hexene.

[10] The polyolefin-composite hollow-fiber membrane according to any one of [1] to [9] above, wherein the environmental stress cracking resistance of the polyolefins of the porous membrane layer as measured in accordance with JIS K6760 is 10 to 50 hours.

[11] The polyolefin-composite hollow-fiber membrane according to any one [1] to [10] above, wherein the density of the polyolefins of the porous membrane layer is 0.960 to 0.968 g/cm$^3$.

[12] The polyolefin-composite hollow-fiber membrane according to any one of [1] to [11] above, wherein the density of the polyolefins of the homogeneous membrane layer is 0.850 to 0.910 g/cm$^3$.

[13] The polyolefin-composite hollow-fiber membrane according to any one of [1] to [12] above, wherein the melting point, Tm, of the polyolefins of the homogeneous membrane layer is 40 to 100° C.

[14] A method for producing the polyolefin-composite hollow-fiber membrane according to any one of [1] to [13] above comprising the extending step of extending a hollow-fiber membrane precursor comprising a non-extended homogeneous membrane layer precursor that is the precursor of the homogeneous membrane layer and a non-extended porous membrane layer precursor that is the precursor of the porous membrane layer, at an extending temperature T (° C.), that satisfies the requirements (i) and (ii) below, and increasing the porosity of the porous membrane layer precursor.

(i) The relationship between the extending temperature, T, and the melting temperature, Tm, of the polyolefins of the homogeneous membrane layer, is Tm−20≤T≤Tm+40.
 (ii) The extending temperature, T, is no more than the Vicat softening point of the polyolefins of the porous membrane layer.

[15] A hollow-fiber membrane module comprising the polyolefin-composite hollow-fiber membrane according to any one of [1] to [13] above.

The term "constitutional unit" used in the present specification and the scope of the claims, refers to monomer unit that constitute the resin component (polymer and copolymer).

Effects of the Invention

The polyolefin-composite hollow-fiber membrane of the present invention has excellent solvent resistance and gas permeability. Therefore, when used in the deaeration of dissolved gas in a drug solution, it can suppress leakage of the drug solution to a high degree, and can efficiently reduce the amount of dissolved gas.

In addition, according to the production method of the present invention, a polyolefin-composite hollow-fiber membrane having excellent solvent resistance and gas permeability, when used in the deaeration of dissolved gas in a drug solution, can suppress leakage of the drug solution to a high degree, and can efficiently reduce the amount of dissolved gas, can be obtained.

In addition, since the hollow-fiber membrane module of the present invention comprises the polyolefin-composite hollow-fiber membrane, when used in the deaeration of dissolved gas in a drug solution, it can suppress leakage of the drug solution to a high degree, and can efficiently reduce the amount of dissolved gas.

PREFERRED MODE FOR CARRYING OUT THE INVENTION

Polyolefin-Composite Hollow-Fiber Membrane

Figure 1:
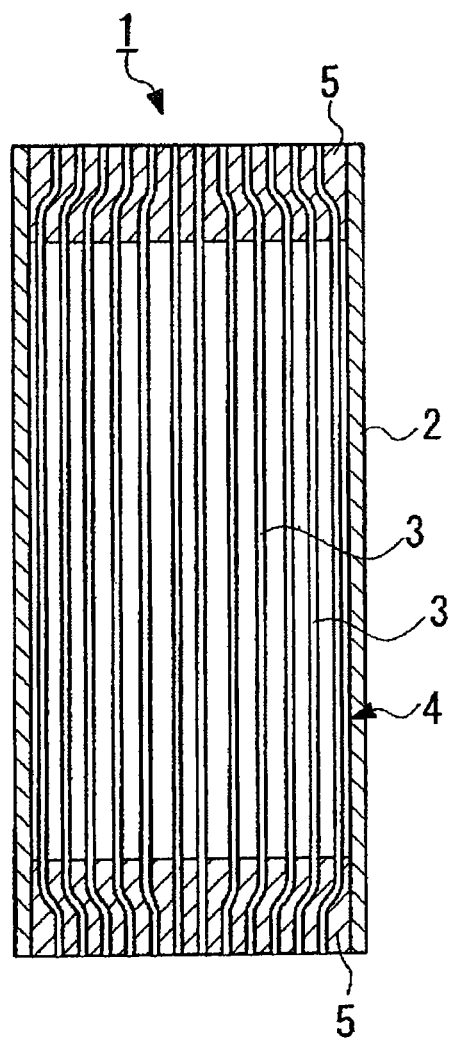
FIG. 1 A diagram showing the schematic cross-section of one example of the hollow-fiber membrane module of the present invention.

The polyolefin-composite hollow-fiber membrane of the present invention (hereinafter referred to as "the present composite hollow-fiber membrane"), is a composite hollow-fiber membrane comprising a non-porous homogeneous membrane layer that is permeable to gas and a porous membrane layer that supports the homogeneous membrane layer.

The homogeneous membrane layer comprises polyolefins having an Mw/Mn ratio of mass average molecular weight (hereinafter referred to as "Mw") and number average molecular weight (hereinafter referred to as "Mn"), of no more than 4.0, and a melt flow rate as measured in accordance with code D of JIS K7210 (hereinafter referred to as MFRD) (measurement temperature: 190° C., load: 2.16 kg) of no more than 1.0 g/10 min. The porous membrane layer comprises polyolefins having an Mw/Mn ratio of 8.0 to 12.0.

Hereinafter, the polyolefins contained in the homogeneous membrane layer is referred to as "polyolefin A" while the polyolefins contained in the porous membrane layer is referred to as "polyolefin B".

(Homogeneous Membrane Layer)

The homogeneous membrane layer is a layer consisting of a non-porous membrane containing polyolefin A with gas permeability.

The Mw/Mn ratio of polyolefin A is no more than 4.0, and is preferably 1.5 to 3.0, and more preferably 1.8 to 2.5. The moldability of resins, in general, is affected by viscosity. Moreover, viscosity is highly dependent on Mw. In order to reduce the defect (such as leaks and the like) of the homogeneous membrane layer, it is necessary to increase the Mn. Additionally, in order to achieve high craze strength while maintaining moldability, it is preferable to reduce the Mw/Mn ratio (polydispersity).

When the Mw/Mn ratio is no more than 4.0, it becomes possible to increase the strength while maintaining the moldability, and to obtain the present composite hollow-fiber membrane having excellent gas permeability and solvent resistance.

In the case where polyolefin A is comprised of single substance, the Mw/Mn ratio represents the spread of the molecular weight distribution, wherein a bigger value indicates wider distribution of the molecular weight.

When polyolefin A is comprised of single substance, its Mw/Mn ratio can be adequately adjusted by preparing the polyolefin A through multistep polymerization. As a method for multistep polymerization, two-step polymerization method or three-step polymerization method, in which a high molecular weight component is polymerized in the first step and a low molecular weight component is polymerized in the second and subsequent steps are preferred.

Alternatively, the Mw/Mn ratio can also be adjusted by changing the type of catalyst used in the production of polyolefin A.

The Mw/Mn ratio of polyolefin A is calculated from a measurement made by high temperature gel permeation chromatography (hereinafter referred to as "high temperature GPC"). High temperature GPC refers to GPC measured in a state where the sample (polyolefin A) is heated and melted. The Mw/Mn ratio can be calculated from a calibration curve made from high temperature GPC measurements using polystyrene as the standard.

The measurement can be made with commercially available devices such as "150-GPC", "Alliance GPCV 2000" (from Waters), and the like.

The MFRD of polyolefin A is no more than 1.0 g/10 min. and is preferably 0.1 to 1.0 g/10 min. When the MFRD of polyolefin A is no more than 1.0 g/10 min., the present composite hollow-fiber membrane having excellent gas permeability and solvent resistance can be obtained.

In addition, from the viewpoint of gas permeability as well as solvent resistance, polyolefin A and polyolefin B that will be discussed later, preferably have matching melting characteristics. In other words, it is preferable that the MFRD of polyolefin A is equivalent to the MFRD of polyolefin B, and, moreover, it is further preferable that the difference between the MFRD of polyolefin A and the MFRD of polyolefin B within the range of 0.1 to 1.0 g/10 min, is no more than 0.3 g/10 min.

The density of polyolefin A is preferably 0.850 to 0.910 g/cm$^3$. When the density of polyolefin A is within the above range, the gas permeability of the homogeneous membrane layer improves. In addition, when the density of polyolefin A is no less than 0.850 g/cm$^3$, it becomes easier to obtain polyolefin A having the melting point and Vicat softening point of no less than 30° C.

The density of polyolefin A is measured by a method in accordance with JIS K7112 (ASTM D1505).

The melting point, Tm, of polyolefin A is preferably 40 to 100° C. and more preferably 50 to 100° C.

The melting point, Tm, of polyolefin A is measured by differential scanning calorimetry (DSC).

For polyolefin A, polyethylene or a copolymer (herein after referred to as "copolymer A1") of ethylene and at least one kind of α-olefin having carbon number of 3 to 20 (hereinafter referred to as "α-olefin (a)") is preferred. Polyolefin A can be solely polyethylene or solely copolymer A1, or a mixture of polyethylene and copolymer A1.

Examples of polyethylene include high-density polyethylene (HDPE), low-density polyethylene (LDPE), linear chain low-density polyethylene (LLDPE) and very low-density polyethylene (VLDPE). Among these, LDPE is preferable. Examples of LDPE include Novatec LD (Japan Polychem Corporation) and Neo-Zex (Prime Polymer, Co., Ltd.).

These polyethylenes could be used individually or in combinations of more than 2 kinds.

Examples of α-olefin(a) include, propylene, 1-butene, isobutylene, 1-pentene, 1-hexene, 4-methyl-1-pentene, 1-octene, 1-decene, 1-dodecene, 1-tetradecene, 1-hexadecene, 1-octadecene, 1-eicosene and the like.

The constitutional unit derived from α-olefin(a) is preferably those derived from α-olefin having carbon number of 4 to 20. Specifically, constitutional unit can be derived from propylene, 1-butene, isobutylene, 1-pentene, 1-hexene, 4-methyl-1-pentene, 1-octene, 1-decene, 1-dodecene, 1-tetradecene, 1-hexadecene, 1-octadecene, 1-eicosene and the like. The constitutional unit is more preferably derived from α-olefin having carbon number of 6 to 8. For α-olefin, 1 hexene or 1-octene is especially preferable.

These α-olefins(a) can be used individually, or in combinations of more than 2 kinds.

The content of the constitutional unit derived from the ethylene in the copolymer A1 is preferably 30 to 90 mol % relative to 100 mol % of the total constitutional unit derived from all of the monomers used in polymerization, and more preferably 60 to 80 mol %.

The content of the constitutional unit derived from the α-olefin(a) in the copolymer A1 is preferably 10 to 70 mol % relative to 100 mol % of the total constitutional unit derived from all of the monomers used in polymerization, and more preferably 20 to 40 mol %.

As to the polyethylene and the copolymer A1, those polymerized using metallocene catalyst are preferable. In comparison to polyethylenes and the like produced with Ziegler-Natta catalyst, those produced with metallocene catalyst have narrower molecular weight distribution and have less amount of low molecular weight components and low crystal components, even though they are chemically identical to the former. For this reason, the use of metallocene catalyst improves the solvent resistance, engine oil resistance, solvent extractability resistance, beef tallow resistance and the like of the polyethylene and copolymer A1. In addition, the use of metallocene catalyst is also preferable from the perspective of improving the strength of the homogeneous membrane layer while maintaining its moldability.

Examples of metallocene catalyst include INSITE (single-site) catalyst (Dow Chemical Co.), constrained geometry catalyst and the like.

As to polyolefin A, copolymer A1 produced with metallocene catalyst is especially preferable.
Examples of commercially available copolymer A1 include "Evolue (trademark)" (a copolymer of ethylene and 1-hexene from Prime Polymer Co., Ltd.) and "Affinity (trademark)" (a copolymer of ethylene and 1-octene from Dow Chemical Co.).

In addition, polyolefin A can be a copolymer of ethylene, α-olefin(a) and other polymerizable monomers.

In this case, the content of the constitutional unit derived from other polymerizable monomers in the copolymer, is preferably no more than 10 mol % relative to 100 mol % of the total constitutional unit derived from all of the monomers used in polymerization, and more preferably no more than 5 mol %.

The homogeneous membrane layer is preferably a layer having polyolefin A as the main component. A layer having polyolefin A as the main component means a layer whose polyolefin A content is no less than 90 mass % relative to the 100 mass % of the total resins that constitute the layer. The content of polyolefin A in the layer having polyolefin A as the main component, is preferably no less than 95 mass % relative to the 100 mass % of the total resins that constitute the layer, and more preferably no less than 99%, and most preferably 100 mass %.

In addition, additives such as antioxidant, ultraviolet absorber, lubricant, anti blocking agent, coloring agent, flame retardant and the like, may be added to the homogeneous membrane layer, as needed, as long as they do not interfere with the goal of the present invention.

The content of the constitutional unit derived from the α-olefin(a) in polyolefin A is preferably no less than 10 mol % relative to 100 mol % of the total constitutional unit derived from all of the monomers used in polymerization, and is more preferably 20 to 40 mol %. Polyolefin A is preferably copolymer A1 comprising no less than 10% of constitutional unit derived from α-olefin(a), and more preferably copolymer A1 comprising 20 to 40% of constitutional unit derived from α-olefin(a).

The thickness of the homogeneous membrane layer is preferably 0.5 to 10 μm. When the thickness of the homogeneous membrane layer is no less than 0.5 μm, the pressure resistance improves. When the thickness of the homogeneous membrane layer is no more than 10 μm, the gas permeability improves.

When the present composite hollow-fiber membrane comprises multiple homogeneous membrane layers, the thickness of the homogeneous layer mentioned above applies to each of the homogeneous membrane layers.

(Porous Membrane Layer)

Porous membrane layer consists of porous membrane containing polyolefin B, and is a layer that supports the homogeneous membrane.

The Mw/Mn ratio of the polyolefin B is preferably 8.0 to 12.0. When the Mw/Mn ratio is no less than 8.0, the amount of high molecular weight component increases, resulting in the improvement of environmental stress cracking resistance (hereinafter referred to as "ESCR"). When the Mw/Mn ratio is no more than 12.0, the amount of low molecular weight component such as wax remains low, and the elution of polyolefin B can be easily regulated, even for highly demanding purposes such as for flat panel displays (FPD). In addition, the rigidity of the porous membrane layer improves by narrowing the range of molecular weight distribution of polyolefin B. The Mw/Mn ratio of polyolefin B more preferably 8.0 to 12.0.

The Mw/Mn ratio of polyolefin B is calculated from the high temperature GPC measurements in the same way as the Mw/Mn ratio of polyolefin A.

When polyolefin B is comprised of single substance, its Mw/Mn ratio can be adequately adjusted by preparing polyolefin B through multistep polymerization, as in the case for polyolefin A. Alternatively, the Mw/Mn ratio can also be adjusted by changing the type of catalyst used in the production of polyolefin B.

The content of polyolefin B component having the molecular weight of no more than 1000 (hereinafter referred to as "FL") is preferably 0.1 to 2.0 mass % relative to 100 mass % of total copolymer that constitutes polyolefin B, and more preferably 0.1 to 1.0 mass % and most preferably 0.2 to 0.5 mass %. FL is a component of polyolefins that is called a low molecular weight component. When FL is no more than 2 mass %, odor will not be an issue and it can suitably be used for food and the like. When FL is no less than 0.1 mass %, its flexibility is improved.

The content of polyolefin B component having the molecular weight of no less than 1 million (hereinafter referred to as "FH") is preferably 1.5 to 3.0 mass % relative to 100 mass % of total copolymer that constitutes polyolefin B. When FH is no less than 1.5 mass %, the content of so-called high molecular weight component, which contributes to long term characteristics, is increased, and stress cracking resistance as well as ESCR is improved. In addition, when FH is no more than 3.0 mass %, it becomes easier to obtain sufficient fluidity during the molding. Furthermore, it becomes much harder to form non-melted gel, reducing the possibility of unintended non-porous portion to form during the extending step.

FL and FH can be obtained from the high temperature GPC already discussed above for the Mw/Mn ratio. Specifically, in the chart showing the molecular weight distribution obtained from the high temperature GPC measurements, FL can be obtained from the ratio of the area corresponding to those having molecular weight of no more than 1000 to the total area of the molecular weight distribution. Likewise, FH can be obtained from the ratio of the area corresponding to those having molecular weight of no less than 1 million to the total area of the molecular weight distribution.

Polyolefin B preferably is a polyolefin that satisfies the requirements (a) to (c) below.

(a) Its MFRD is 0.1 to 1.0 g/10 min.

(b) Melt flow rate (hereinafter referred to as "MFRG") as measured in accordance with code G of JIS K7210 (measurement temperature: 190° C., load: 21.6 kg) is 50 to 100 g/10 min.

(c) The ratio of MFRD and MFRG above, FRR(G/D) (=MFRG/MFRD), is 50 to 100.

When the MFRD of polyolefin B is no less than 0.1 g/10 min., it becomes easier to keep melt viscosity from getting too high, thereby increasing the molding range where the orientation of the crystal can be improved. In addition, it becomes easier to adopt it to a field where miniaturization of water purifier and the like is required. When the MFRD of polyolefin B is no more than 1.0 g/10 min., it becomes easier to keep melt viscosity from getting too low. It also improves the orientation of the crystal by raising the draft ratio, and makes it easier to increase the porosity during the extending step. Moreover, it improves the rigidity, thereby making it easier to improve the gas permeability by reducing the thickness and increasing the porosity.

When the MFRG of polyolefin B is no less than 50 g/10 min., its moldability at high speed improves.

When the MFRG of polyolefin B is no more than 100 g/10 min., it becomes easier to achieve excellent ESCR. Here, the moldability at high speed is a property that is evaluated by judging how much one can increase the discharge velocity while reducing the load of the extruder under the same condition, or how much one can decrease the molding temperature while keeping the load of the extruder unchanged. The MFRG of polyolefin B is more preferably 60 to 90 g/10 min. The ratio of MFRG and MFRD, FRR(G/D), in general, is correlated with the distribution of molecular weight, with the ratio having bigger values as the molecular weight distribution becomes wider.

When the FRR(G/D) of polyolefin B is no less than 50, the load of the extruder during molding becomes low and the moldability at high speed improves. When the FRR(G/D) of polyolefin B is no more than 100, the impact strength of the porous membrane layer improves. The FRR(G/D) of polyolefin B is preferably 60 to 80.

From the perspective of gas permeability as well as solvent resistance, it is preferable to match the melt properties of polyolefin A and polyolefin B. For this reason, the MFRD of each is preferably 0.1 to 1.0 g/10 min., and more preferably have the same value within this range.

The density of polyolefin B is preferably 0.960 to 0.968 g/cm$^3$. When the density of polyolefin B is no less than 0.960 g/cm$^3$, the amount of low crystal component is reduced, improving the openness of the porous membrane layer and contributing to achieving sufficient gas permeability. When the density of polyolefin B is no more than 0.968 g/cm$^3$, it becomes easier to maintain ESCR of no less than 10 hours.

ESCR (environmental stress cracking resistance) of polyolefin B is preferably 10 to 50 hours.

ESCR of polyolefin B is measured by constant strain environmental stress cracking test performed in accordance with JIS K6760. ESCR is the time when the possibility of cracking due to environmental stress occurs reaches 50%.

From the viewpoint of openness, high-density polyethylene having less, short branching chains is preferred as polyolefin B.

Examples of commercially available polyolefin B include "H6670B", "H6430BM" (from SCG Chemical Co.) and the like.

The porous membrane layer is preferably a layer having polyolefin B as the main component. A layer having polyolefin B as the main component means a layer in which the polyolefin B content is no less than 90 mass % relative to 100 mass % of the total resin content that constitutes the layer. The content of polyolefin B in the layer having polyolefin B as the main component, is preferably no less than 95 mass % relative to 100 mass % of the total resin content that constitutes the layer and more preferably, no less than 99 mass %, and most preferably, 100 mass %.

In addition, additives such as antioxidant, ultraviolet absorber, lubricant, anti blocking agent, coloring agent, flame retardant and the like, may be added to the porous membrane layer, as needed, as long as they do not interfere with the goal of the present invention.

The thickness of the porous membrane layer is preferably 10 to 200 µm. When the thickness of the porous membrane layer is no less than 10 µm, its mechanical strength is improved. When the thickness of the porous membrane layer is no more than 200 µm, it contributes to keeping the fiber diameter of the present composite hollow-fiber membrane from becoming too large, thereby inhibiting the volume efficiency to become low when embedding it into a membrane module.

When the present composite hollow-fiber membrane comprises multiple porous membrane layers, the thickness of the porous membrane layer above applies to each of the porous membrane layer.

The porosity of the porous membrane layer is preferably 30 to 80 vol % relative to 100 vol % of the total volume of the porous membrane layer. When the porosity is no less than 30 vol %, excellent gas permeability can easily be achieved. When the porosity is no more than 80 vol %, the mechanical strength such as pressure resistance improves.

The size of the pores in the porous membrane layer is not especially limited. It can be of any size as long as sufficient gas permeability and mechanical strength are achieved.

The present composite hollow-fiber membrane comprises the homogeneous membrane layer and the porous membrane layer explained above.

The present composite hollow-fiber membrane can be a composite membrane having 2 layer structure containing a homogeneous membrane layer and a porous membrane layer, or a composite membrane having 3 layer structure containing a homogeneous membrane layer sandwiched between 2 porous membrane layers. In addition, the numbers of homogeneous membrane layer and porous membrane layer are not limited to those mentioned above. The composite membrane can have the total number of layers of no less than 4.

The diameter of the present composite hollow-fiber membrane is not limited, however, the outer diameter of the hollow-fiber membrane is preferably 100 to 2000 µm. When the outer diameter of the hollow-fiber membrane is no less than 100 µm, spacing between the hollow-fiber membranes can easily be secured during the production of the hollow-fiber membrane module, making it much easier for the potting resin to go in between the hollow-fiber membranes. When the outer diameter of the hollow-fiber membrane is no more than 2000 µm, the size of the module as a whole can be made smaller, even if a hollow-fiber membrane module using a large number of hollow-fiber membranes is to be produced. This leads to the reduction in the volume that requires potting processing, thereby reducing the decline in the dimensional accuracy due to the shrinkage of potting resin during the potting processing.

(Production Method)

The present composite hollow-fiber membrane can be produced, for example, by using a method comprising a spinning step and an extending step as described below.

Spinning step: A step in which polyolefin A and polyolefin B are spun, and a hollow-fiber membrane precursor comprising a non-extended precursor of homogeneous membrane layer that is the precursor of the homogeneous membrane layer, and a non-extended precursor of porous membrane layer that is the precursor of the porous membrane layer is obtained.

Extending step: A step in which the hollow-fiber membrane precursor is extended and the porous membrane layer precursor is made porous.

Spinning Step:

In the case of 3-layer structure, composite hollow-fiber membrane, for example, a composite nozzle mouthpiece wherein an outermost layer nozzle, an intermediate layer nozzle and an innermost layer nozzle are positioned in a concentric fashion, is used. Molten state polyolefin B is supplied to the outermost layer nozzle and the innermost layer nozzle, while molten state polyolefin A is supplied to the intermediate layer nozzle. Next, polyolefin A and polyolefin B are extruded from each of the nozzles, and while appropriately adjusting the extrusion speed and winding speed, are cooled and solidified in non-extended state. A hollow-fiber membrane precursor having a 3 layer structure in which a non-extended homogeneous membrane layer precursor is sandwiched between 2 non-extended, non-porous, porous membrane layer precursor, is obtained. The discharge temperature of polyolefin A and polyolefin B can be any temperature as long as they are sufficiently melted and in a state to be spun.

Extending Step:

The non-extended, hollow-fiber membrane precursor obtained by the melt spinning process, is preferably subjected to heat treatment without extension (annealing treatment) at a temperature no more than the above described melting point, prior to the extending step.

The heat treatment without extension is preferably carried out at 105 to 120° C. for 8 to 16 hours. When the temperature is no less than 105° C., hollow-fiber membrane with excellent quality can be easily obtained. When the temperature is no more than 120° C., sufficient elasticity can easily be obtained, thereby improving the stability during the extension, and making it easy to achieve high magnification during the extension. Furthermore, when the treatment time is no less than 8 hours, hollow-fiber membrane with excellent quality can be easily obtained.

The hollow-fiber membrane precursor is extended in a condition satisfying the requirements (i) and (ii) below.

(i) The relationship between the extension temperature T (° C.) and the melting point of polyolefin A Tm (° C.) is, $Tm-20 \leq T \leq Tm+40$.

(ii) The extension temperature T is no more than Vicat softening point of polyolefin B.

When the extension temperature T is no less than Tm−20 (° C.), the porous membrane layer precursor can easily be made porous, thereby making it easy to obtain the present hollow-fiber membrane having excellent gas permeability. When the extension temperature T is no more than Tm+40 (° C.), generation of defects due to molecular disturbance such as pinholes is easily suppressed.

In addition, when the extension temperature T is no more than the Vicat softening point of polyolefin B, the porous membrane layer precursor can easily be made porous, thereby making it easy to obtain the present hollow-fiber membrane having excellent gas permeability.

In the extending step, it is preferable to carry out cold extension prior to carrying out the extension at the extension temperature T (heated extension). In other words, it is preferable to perform 2 step extension in which a cold extension is followed by heated extension, or multi-step extension in which a cold extension is followed by no less than 2 steps of heated extensions.

Cold extension is an extension performed at a relatively low temperature wherein structural destruction of membrane is induced and micro cracks are generated. Cold extension is preferably carried out at a relatively low temperature ranging from 0° C. to a temperature not exceeding Tm−20° C.

Low speed extension is the preferred method for the extension. When the speed of extension is low, fiber diameter can be inhibited from becoming too small during the extension, making it easier to form pores. Low speed extension refers to extension performed at a thermal transformation speed of no more than 2.0/min. The thermal transformation speed is represented by the following formula: (winding speed (m/min)−fiber feeding speed (m/min))/length of thermal transformation (m).

The magnification of extension depends on the kinds of polyolefin A and polyolefin B used, however, the final magnification (total extension magnification) relative to the non-extended hollow-fiber membrane precursor is preferably 2 to 5 fold. When the total extension magnification is no less than 2 fold, the porosity of the porous membrane layer is increased, thereby making it easier to obtain excellent gas permeability. When the total extension magnification is no more than 5 fold, the rupture elongation of the present hollow-fiber membrane is improved.

Moreover, in order to improve the dimensional accuracy of the hollow-fiber membrane obtained by the extension, it is preferable to subject the porous hollow-fiber membrane to heat setting procedure under a condition where it is not extended or it is relaxed a little within a range not exceeding 40%.

In order to effectively perform heat setting procedure, the heat setting temperature is preferably no less than the extension temperature and no more than the melting point temperature.

The present composite hollow-fiber membrane explained above comprises the homogeneous membrane layer formed from polyolefin A and the porous membrane layer formed from polyolefin B, exhibiting excellent solvent resistance and gas permeability. It also exhibits excellent low leachability.

In terms of the uses of the present composite hollow-fiber membrane, it is preferably used, especially for deaeration of dissolved gases from aqueous solution or organic solvent (such as resist solution), in the production lines for semiconductors, color filters for liquid crystals and inks for ink jet printers.

Hollow-Fiber Membrane Module

The hollow-fiber membrane module of the present invention is a module comprising the present composite hollow-fiber membrane described above. The hollow-fiber membrane module of the present invention employs the same configuration as the other publicly known hollow-fiber membrane modules except for utilizing the present composite hollow-fiber membrane.

Figure 2:
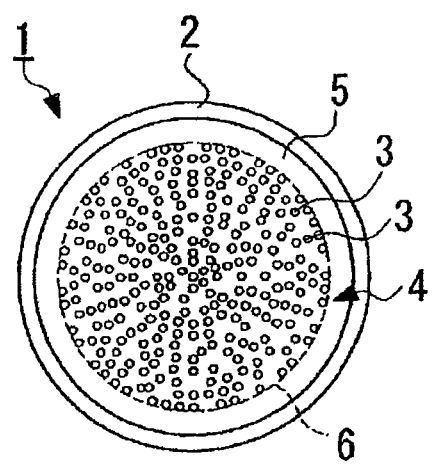
FIG. 2 A diagram showing the end view of one example of the hollow-fiber membrane module of the present invention.

FIG. 1 shows a schematic cross section of an example of the hollow-fiber membrane module of the present invention. FIG. 2 shows an end-view of an example of the hollow-fiber membrane module of the present invention.

FIGS. 1 and 2 shows the well-known configuration of hollow-fiber membrane module 1, in which hundreds of the present composite hollow-fiber membrane 3 are bundled together and inserted into a tube like housing 2, and are encapsulated by encapsulating material 5 (potting resin).

EXAMPLES

Below, the present invention is explained in detail by way of Examples and Comparative Examples. However, the present invention is not limited in any way, by the disclosures below.

(Melt Flow Rate (MFR))

In regard to MFR of polyolefin, MFRD (unit: g/10 min.) was measured in accordance with code D of JIS K7210 (measurement temperature: 190° C., load: 2.16 kg), and MFRG (unit: g/10 min.) was measured in accordance with code G of JIS K7210 (measurement temperature: 190° C., load: 21.6 kg).

Furthermore, from these results, FRR(G/D)(=MFRG/MFRD) was calculated.

(Density)

Density of polyolefins (unit: kg/m$^3$) was measured in accordance with JIS K7112.

(Mw/Mn Ratio)

The Mw/Mn ratio of polyolefins was calculated from Mw and Mn derived from the calibration curve obtained by measurements of GPC (high temperature GPC) made under the condition described below. For the calibration curve, polystyrene standards were measured and the calibration curve was plotted using polyethylene conversion constant (0.48) and 3$^{rd}$ order calculation. As to the columns, three columns described below were used connected in series.
Measurement Condition:
  Measurement apparatus: "150-GPC" (Waters Co.)
  Column: "Shodex GPC AT-807/S" (Showa Denko K.K.) (one column), "Tosoh TSK-GEL GMH6-HT" (Tosoh Co., Ltd.) (two columns)
  Solvent: 1,2,4-trichlorobenzene
  Column temperature: 140° C.
  Sample concentration: 0.05 mass % (injection amount: 500 μl)
  Flow rate: 1.0 ml/min.
  Sample melting temperature: 160° C.
  Sample melting time: 2.5 hours In regard to the polyolefins used in the formation of porous membrane layer, the Mw and Mn of each components such as low molecular weight component and high molecular weight component and the like, and the content ratio of these components were calculated, using the molecular weight distribution chart obtained from measurements made by high temperature GPC described above, with approximation using Gaussian distribution when shoulder peaks are observed.
(FL, FH)

The contents of the polyolefin component with molecular weight of no more than 1000 (FL) (unit: mass %) and the component with molecular weight of no less than 1 million (FH) (unit: mass %) were calculated after measuring the molecular weight distribution by high temperature GPC under the condition described below. Specifically, in the chart showing the molecular weight distribution obtained from the high temperature GPC measurements, FL and FH were calculated from the ratio of the area corresponding to those having molecular weight of no more than 1000 or the ratio of the area corresponding to those having molecular weight of no less than 1 million, to the total area of the molecular weight distribution. As to the columns, three columns described below were used connected in series.
Measurement Condition:
  Measurement apparatus: "Alliance GPCV 2000" (Waters Co.)
  Column: "AT-807S" (Showa Denko K.K.) (one column), "GMHHR-H(S)HT" (Tosoh Co., Ltd.)
  Solvent: 1,2,4-trichlorobenzene
  Column temperature: 140° C.
  Sample concentration: 20 mg/solvent 10 ml
  Flow rate: 1.0 ml/min.
  Sample melting temperature: 140° C.
  Sample melting time: 1 hour
(ESCR)

ESCR (environmental stress cracking resistance, unit: time) of polyolefin was measured by constant strain environmental stress cracking test in accordance with JIS K6760. For the testing solution, 10 mass % aqueous solution of "Igepal CO-630" (Rhodia Nikka Co.) was used. Time required for the cracking by environmental stress to occur at the possibility of 50% was measured as the ESCR value.
(Melting Point)

Using a differential scanning calorimetry (DSC) from Seico Electronics Industrial Co., Ltd., about 5 mg of sample was melted at 200° C. for 5 minutes, and after crystallizing the sample by lowering the temperature to 40° C. at 10° C./min., the temperature was raised to 200° C. at 10° C./min. When the sample started melting, the peak melting temperature and the temperature when the sample completed melting were measured. The melting point (Tm, unit: ° C.) of polyolefin was calculated from the melting peak temperature and the melting completion temperature.
(Porosity)

The porosity (unit: vol %) of the obtained polyolefin-composite hallow-fiber membrane was measured by a mercury porosimeter type 221 (Carlo Erba Co.).
(Gas Permeability)

A hollow-fiber membrane module was produced by bundling the obtained polyolefin-composite hollow-fiber membrane into a shape of letter U and solidifying the end of the hollow-fiber membrane with urethane resin. Oxygen or nitrogen was then applied from the outside of the composite hollow-fiber membrane, while the pressure in the inner side of the hollow-fiber membrane (hollow side) was maintained constant, and oxygen transmission rate ($Q_{O2}$) (unit: m/hour·MPa) and nitrogen transmission rate ($Q_{N2}$) (unit: m/hour·MPa) in 25° C. were measured. The area of membrane was calculated from the inner diameter of the hollow-fiber membrane. The separation coefficient ($Q_{O2}/Q_{N2}$) was obtained from oxygen transmission rate ($Q_{O2}$) and nitrogen transmission rate ($Q_{N2}$) measured.

Gas permeability was evaluated using the following standard.

"○": In the polyolefin-composite hollow-fiber membrane, the separation coefficient of the polyolefin used in the formation of the homogeneous membrane layer is maintained, and oxygen transmission rate ($Q_{O2}$) is no less than 0.120 m/hour·MPa, and nitrogen transmission rate ($Q_{N2}$) is no less than 0.040 m/hour·MPa.

"x": One or more of the requirements below is not met; the maintenance of the separation coefficient of the polyolefin used in the formation of the homogeneous membrane layer, oxygen transmission rate ($Q_{O2}$) of no less than 0.120 m/hour·MPa, and nitrogen transmission rate ($Q_{N2}$) of no less than 0.040 m/hour·MPa.
(Solvent Resistance)

Resistance to solvent was evaluated depending on whether leakage is observed after flowing 2-propanol through the polyolefin-composite hollow-fiber membrane obtained. Ones without leakage are indicated by "○", while ones with leakage are indicated by "x".

Example 1

As polyolefin A (for the formation of the homogeneous membrane layer), ethylene-octene copolymer produced using metallocene catalyst (commercially available with product name "Affinity EG8100G", Dow Chemical Co., MFRD: 1.0 g/10 min., density: 0.870 g/cm$^3$, melting point Tm: 55° C., Mw/Mn=2.0, octene content: 35 mol %) was used.

As polyolefin B (for the formation of the porous membrane layer), high density polyethylene produced using Ziegler catalyst and three step continuous polymerization method (product name "H6670B", SCG Chemical Co., density: 0.966 g/cm$^3$, MFRD: 0.7 g/10 min., MFRG: 54 g/10 min., FRR(G/D)=77, FL: 0.38 mass %, FH: 2.64 mass %, Mw/Mn=8.8, ESCR: 20 hours) was used. The three components approximated by Gaussian distribution from the molecular weight distribution chart obtained by high temperature GPC of the high density polyethylene used for the formation of the porous membrane layer was as follows.

The chart exhibited two shoulder peaks, one at around molecular weight of 1 million, and another at around molecular weight of 5000.

1) Mn: $1.99 \times 10^4$ Mw: $1.09 \times 10^5$ content ratio: 88% 2) Mn: $2.76 \times 10^3$ Mw: $5.25 \times 10^3$ content ratio: 6% 3) Mn: $7.52 \times 10^5$ Mw: $9.74 \times 10^5$ content ratio: 6%

Spinning Step:

A composite nozzle mouthpiece wherein an outermost layer nozzle, an intermediate layer nozzle and an innermost layer nozzle are positioned in a concentric fashion, was used. Molten state polyolefin B was supplied to the outermost layer nozzle and the innermost layer nozzle, while molten state polyolefin A was supplied to the intermediate layer nozzle. These polyolefin were spun at the winding speed of 90 m/min. to obtain the non-extended hollow-fiber membrane precursor. The hollow-fiber membrane precursor had a 3 layer structure in which the homogeneous membrane layer precursor was sandwiched between 2 porous membrane layer precursors in a concentric manner. The inner diameter of the hollow-fiber membrane precursor was 200 μm.

Extending Step:

The hollow-fiber membrane precursor was subjected to anneal treatment at 108° C. for 8 hours. It was extended at 23±2° C. to 1.25 fold, then heat extended further at 100° C. in a heating furnace until the total extended amount was 4.4 fold, thereby making the 2 porous membrane layer precursors porous. Subsequently, it was subjected to a relaxing step of 0.4 fold at 100° C. in a heating furnace, so that it was molded at the final magnification of extension (magnification relative to non-extended hollow-fiber membrane precursor) of 4 fold, and at the heat transformation speed of 0.75/min., to obtain the polyolefin-composite hollow-fiber membrane. The polyolefin-composite hollow-fiber membrane had 3 layer structure in which the homogeneous layer was sandwiched between 2 porous membrane layers. In addition, the porosity of the polyolefin-composite hollow-fiber membrane was 63.0 vol %.

Example 2

As polyolefin A, ethylene-octene copolymer produced using metallocene catalyst (commercially available with product name "ENGAGE 7387", Dow Chemical Co., MFRD: 0.5 g/10 min., density: 0.870 g/cm$^3$, melting point Tm: 50° C., Mw/Mn=2.0, octene content: 35 mol %) was used.

As polyolefin B, high density polyethylene produced using Ziegler catalyst and three step continuous polymerization method (product name "H6430BM", SCG Chemical Co., density: 0.966 g/cm$^3$, MFRD: 0.4 g/10 min., MFRG: 30 g/10 min., FRR(G/D)=75, FL: 0.66 mass %, FH: 3.07 mass %, Mw/Mn=12, ESCR: 24 hours) was used.

The three components approximated by Gaussian distribution from the molecular weight distribution chart obtained by high temperature GPC of the high density polyethylene used for the formation of the porous membrane layer was as follows. The chart exhibited two shoulder peaks, one at around molecular weight of 1 million, and another at around molecular weight of 5000.

1) Mn: $2.81 \times 10^3$ Mw: $6.57 \times 10^3$ content ratio: 9% 2) Mn: $2.24 \times 10^4$ Mw: $1.15 \times 10^5$ content ratio: 84% 3) Mn: $4.68 \times 10^5$ Mw: $9.40 \times 10^5$ content ratio: 7%

Using the polyolefin described above, the spinning step and the extending step were performed in the same way as described for Example 1 above, except that the winding speed employed was changed to 40 m/min., to obtain a polyolefin-composite hollow-fiber membrane having 3 layer structure. In addition, the porosity of the polyolefin-composite hollow-fiber membrane was 65.0 vol %.

Comparative Example 1

As polyolefin B, high density polyethylene (product name "HY540", Japan Polyethylene Co., density: 0.960 g/cm$^3$, Vicat softening point: 129° C., MFRD: 1.0 g/10 min., MFRG: 45 g/10 min., FRR(G/D)=45, Component content (FL): 0.37 mass %, Component content (FH): 1.07 mass %, Mw/Mn=6.6, ESCR: 100 hours) was used.

High temperature GPC of the high-density polyethylene used for the formation of the porous membrane layer did not reveal any shoulder peaks. This is because "HY540" is a homopolymer.

The spinning step and the extending step were performed in the same way as described for Example 1 above, except that the high-density polyethylene described above was used, to obtain a polyolefin-composite hollow-fiber membrane having 3 layer structure. The porosity of the polyolefin-composite hollow-fiber membrane was 47.5 vol %.

Comparative Example 2

As polyolefin A, ethylene-octene copolymer produced using metallocene catalyst (product name "ENGAGE 8400", Dow Chemical Co., MFRD: 30 g/10 min., density: 0.870 g/cm$^3$, melting point Tm: 55° C., Mw/Mn=2.0, octene content: 35 mol %) was used.

Spinning Step:

Spinning was performed in the same way as described for Example 1 above except that the ethylene-octene copolymer described above was used, to obtain a hollow-fiber membrane precursor having 3 layer structure. The inner diameter of the hollow-fiber membrane precursor was 200 μm.

Extending Step:

The hollow-fiber membrane precursor was subjected to anneal treatment as in Example 1. It was extended at 23±2° C. to 1.25 fold, then heat extended further at 70° C. in a heating furnace until the total extended amount was 4.4 fold, thereby making the 2 porous membrane layer precursors porous. Subsequently, it was subjected to a relaxing step of 0.4 fold at 100° C. in a heating furnace, so that it was molded at the final magnification of extension of 4 fold, and at the heat transformation speed of 0.75/min., to obtain a polyolefin-composite hollow-fiber membrane.

The polyolefin-composite hollow-fiber membrane had 3 layer structure in which the homogeneous layer was sandwiched between 2 porous membrane layers.

Comparative Example 2

As polyolefin A, polyethylene produced using Ziegler-Natta catalyst (product name "FLEXMORE DFDB-1085NT", Dow Chemical Co., MFRD: 1.0 g/10 min., density: 0.884 g/cm$^3$, melting point 118° C., Mw/Mn=7.0) was used.

Spinning Step:

Spinning was performed in the same way as described for Example 1 above except that the polyethylene described above was used, to obtain a hollow-fiber membrane precursor having 3 layer structure. The inner diameter of the hollow-fiber membrane precursor was 200 μm.

Extending Step:

The hollow-fiber membrane precursor was subjected to anneal treatment as in Example 1. It was extended at 23±2° C. to 1.25 fold, then heat extended further at 110° C. in a heating furnace until the total extended amount was 4.4 fold. Subsequently, it was subjected to a relaxing step of 0.4 fold at 100° C. in a heating furnace, so that it was molded at the final magnification of extension of 3 fold, and at the heat transformation speed of 0.75/min., to obtain a polyolefin-composite hollow-fiber membrane.

The polyolefin-composite hollow-fiber membrane had 3 layer structure in which the homogeneous layer was sandwiched in between 2 porous membrane layers.

Oxygen transmission rate ($Q_{O2}$) and nitrogen transmission rate ($Q_{N2}$) were measured for each of the polyolefin-composite hollow-fiber membrane obtained in the examples above, and their gas permeability and solvent resistance were evaluated, the results of which are summarized in Table 1 below.

addition, it had low oxygen transmission speed and low nitrogen transmission speed, and thereby lower gas permeability in comparison to the Examples. Furthermore, leakage was observed after solvent flow, demonstrating poor solvent resistance.

The polyolefin-composite hollow-fiber membrane of Comparative Example 3 that used polyethylene having the Mw/Mn of 7.0 for the formation of the homogeneous membrane layer, had lower separation coefficient than that of polyethylene used for the formation of the homogeneous membrane layer.

In addition, it had low oxygen transmission speed and low nitrogen transmission speed, and thereby lower gas perme-

TABLE 1

| | | Example 1 | Example 2 | Comparative Example 1 | Comparative Example 2 | Comparative Example 3 |
|---|---|---|---|---|---|---|
| Homogeneous membrane layer | Polymer name | EG8100G | ENGAGE 7387 | EG8100G | ENGAGE 8400 | DFDB-1085NT |
| | Mw/Mn | 2.0 | 2.0 | 2.0 | 2.0 | 7.0 |
| | MFRD [g/10 min.] | 1.0 | 0.5 | 1.0 | 30 | 1.0 |
| | Density [g/cm³] | 0.870 | 0.870 | 0.870 | 0.870 | 0.884 |
| | Melting point Tm [° C.] | 55 | 50 | 55 | 55 | 118 |
| | α-olefin content [mol %] | 35 | 35 | 35 | 35 | 35 |
| | Separation coefficient ($Q_{O2}/Q_{N2}$) | 2.80 | 2.80 | 2.80 | 3.00 | 3.20 |
| Porous membrane layer | Polymer name | H6670B | H6430BM | HY540 | H6670B | H6670B |
| | Mw/Mn | 8.8 | 12 | 6.6 | 8.8 | 8.8 |
| | MFR   MFRD [g/10 min.] | 0.7 | 0.4 | 1.0 | 0.7 | 0.7 |
| |        MFRG [g/10 min.] | 54 | 30 | 46 | 54 | 54 |
| |        FRR(G/D) | 77 | 75 | 45 | 77 | 77 |
| | FL [mass %] | 0.38 | 0.66 | 0.37 | 0.38 | 0.38 |
| | FH [mass %] | 2.64 | 3.00 | 1.07 | 2.64 | 2.64 |
| | Density [g/cm³] | 0.966 | 0.966 | 0.960 | 0.966 | 0.966 |
| | ESCR [time] | 20 | 24 | 100 | 20 | 20 |
| | Vicat softening point [° C.] | 128 | 128 | 129 | 128 | 128 |
| Porosity [vol %] | | 63.0 | 65.0 | 47.5 | 63.0 | 63.0 |
| Oxygen transmission speed ($Q_{O2}$) [m/hour · MPa] | | 0.159 | 0.170 | 0.114 | 0.420 | 0.090 |
| Nitrogen transmission speed ($Q_{N2}$) [m/hour · MPa] | | 0.051 | 0.056 | 0.037 | 0.410 | 0.036 |
| Separation coefficient ($Q_{O2}/Q_{N2}$) | | 3.11 | 3.03 | 3.06 | 1.02 | 2.50 |
| Gas permeability | | ○ | ○ | x | x | x |
| Solvent resistance | | ○ | ○ | ○ | x | x |

As can be seen in Table 1, the polyolefin-composite hollow-fiber membrane of Example 1 had the separation coefficient ($Q_{O2}/Q_{N2}$) of 3.11, and the separation coefficient (2.80) of the ethylene-octene copolymer that was used in the formation of the homogeneous membrane layer was maintained. Moreover, oxygen transmission speed and nitrogen transmission speed were both high, demonstrating that it had excellent gas permeability. In addition, no leakage was observed after solvent flow, demonstrating excellent solvent resistance.

Likewise, the polyolefin-composite hollow-fiber membrane of Example 2 also had excellent gas permeability as well as solvent resistance.

On the other hand, in the polyolefin-composite hollow-fiber membrane of Comparative Example 1, the separation coefficient of the ethylene-octene copolymer that was used for the formation of the homogeneous membrane layer was maintained. However, since its porosity was low, the oxygen transmission speed and nitrogen transmission speed were both low, thereby leading to lower gas permeability in comparison to the Examples.

The polyolefin-composite hollow-fiber membrane of Comparative Example 2 that used ethylene-octene copolymer having the MFRD of 30 g/min. for the formation of the homogeneous membrane layer, had significantly lower separation coefficient as compared to other copolymers used. In ability in comparison to the Examples. Furthermore, leakage was observed after solvent flow, demonstrating poor solvent resistance.

INDUSTRIAL APPLICABILITY

The polyolefin-composite hollow-fiber membrane of the present invention is useful for deaeration of dissolved gases from aqueous solution, organic solvent and resist solution, in the production lines for semi-conductors, color filters for liquid crystals and inks for ink jet printers, for example. It is especially useful for deaeration of photoresist liquid for lithography and developing solution that are used in the production line for semi-conductors.

The invention claimed is:
1. A polyolefin-composite hollow-fiber membrane comprising a non-porous, homogeneous membrane layer that is permeable to gas, and a porous membrane layer supporting the homogeneous membrane layer,
wherein the homogeneous membrane layer comprises polyolefins having an Mw/Mn ratio of mass average molecular weight (Mw) and number average molecular weight (Mn), of no more than 4.0, and a melt flow rate as measured in accordance with code D of JIS K7210 (MFRD) of no more than 1.0 g/10 min., and wherein the porous membrane layer comprises polyolefins having an Mw/Mn ratio of 8.0 to 12.0 and having a melt flow rate as measured in accordance with code D of JIS K7210 (MFRD) of 0.1 to 1.0 g/10 min.

2. The polyolefin-composite hollow-fiber membrane according to claim 1, wherein the melt flow rate as measured in accordance with code D of JIS K7210 (MFRD), for the polyolefins of the homogeneous membrane layer and the polyolefins of the porous membrane layer, are both 0.1 to 1.0 g/min.

3. The polyolefin-composite hollow-fiber membrane according to claim 2, wherein the polyolefins of the porous membrane layer satisfy the requirements (b) and (c);
  (b) The melt flow rate as measured in accordance with code G of JIS K7210 (MFRG) is 50 to 100 g/10 min, and
  (c) The ratio of the MFRD and the MFRG, FRR(G/D) (=MFRG/MFRD), is 50 to 100.

4. The polyolefin-composite hollow-fiber membrane according to claim 1, wherein the difference between the MFRD of the polyolefins of the homogeneous membrane layer and the MFRD of the polyolefins of the porous membrane layer is no more than 0.3 g/10 min.

5. The polyolefin-composite hollow-fiber membrane according to claim 1, wherein the content of the component of the polyolefins in the porous membrane layer having the molecular weight of no more than 1000 is no more than 2.0 mass %, and the content of the component having the molecular weight of no less than 1 million is 1.5 to 3.0 mass %.

6. The polyolefin-composite hollow-fiber membrane according to claim 1, wherein the polyolefins of the homogeneous membrane layer is a copolymer comprising constitutional unit derived from α-olefin having a carbon number of 3 to 20.

7. The polyolefin-composite hollow-fiber membrane according to claim 6, wherein the content of the constitutional unit derived from the α-olefin is 10 to 70 mol % relative to 100 mol % of the constitutional unit derived from all of the monomers used in polymerization.

8. The polyolefin-composite hollow-fiber membrane according to claim 6, wherein the carbon number of the constitutional unit derived from the α-olefin is 6 to 8.

9. The polyolefin-composite hollow-fiber membrane according to claim 1, wherein the α-olefin is 1-octene or 1-hexene.

10. The polyolefin-composite hollow-fiber membrane according to claim 1, wherein the environmental stress cracking resistance of the polyolefins of the porous membrane layer as measured in accordance with JIS K6760 is 10 to 50 hours.

11. The polyolefin-composite hollow-fiber membrane according to claim 1, wherein the density of the polyolefins of the porous membrane layer is 0.960 to 0.968 g/cm$^3$.

12. The polyolefin-composite hollow-fiber membrane according to claim 1, wherein the density of the polyolefins of the homogeneous membrane layer is 0.850 to 0.910 g/cm$^3$.

13. The polyolefin-composite hollow-fiber membrane according to claim 1, wherein the melting point, Tm, of the polyolefins of the homogeneous membrane layer is 40 to 100° C.

14. A method for producing the polyolefin-composite hollow-fiber membrane according to claim 1,
  comprising extending a hollow-fiber membrane precursor comprising a non-extended homogeneous membrane layer precursor that is the precursor of the homogeneous membrane layer and a non-extended porous membrane layer precursor that is the precursor of the porous membrane layer, at an extending temperature T(° C.), that satisfies the requirements (i) and (ii) below, and increasing the porosity of the porous membrane layer precursor:
  (i) The relationship between the extending temperature, T, and the melting temperature, Tm, of the polyolefins of the homogeneous membrane layer, is $Tm-20 \leq T \leq Tm+40$, and
  (ii) The extending temperature, T, is no more than the Vicat softening point of the polyolefins of the porous membrane layer.

15. A hollow-fiber membrane module comprising the polyolefin-composite hollow-fiber membrane according to claim 1.

* * * * *